Feb. 19, 1952     G. B. ELLIS     2,585,922
HERMETICALLY SEALED ALKALINE DRY CELL

Filed April 3, 1950

INVENTOR.
GRENVILLE B. ELLIS

BY Harry M. Saragovitz
Attorney

Patented Feb. 19, 1952

2,585,922

UNITED STATES PATENT OFFICE 2,585,922

HERMETICALLY SEALED ALKALINE DRY CELL

Grenville B. Ellis, Red Bank, N. J., assignor to the United States of America as represented by the Secretary of the Army Application April 3, 1950, Serial No. 153,686

1 Claim. (Cl. 136—107)

(Granted under the act of March 3, 1883, as amended April 30, 1928; 370 O. G. 757)

The invention described herein may be manufactured and used by or for the Government for governmental purposes without the payment of any royalty thereon.

This relates to primary alkaline dry cells and more particularly to improved container means for assembling and hermetically sealing dry cells of this type while simultaneously isolating the anodic and cathodic material within these cells.

It has heretofore been customary to use relatively inert metals, such as steel, nickel or carbonized iron as structural materials for cell containers in which the internal elements of alkaline dry cells are hermetically sealed. It has also been customary to substitute for some part, if not all, of these cell containing materials, plastic dielectric compositions in an attempt to overcome the chemical and electrical insulating problems inherent in such structures. Some of the difficulties encountered in what has been done commercially to devise a practical cell container for both commercial and military usage are the prevention of electrical couples or salt bridges between the contents of the cell and the container, usually resulting in the expansion and "blowing up" of the cell after continued usage or storage; the necessity of prohibiting the circulation or seepage of cathodic and anodic material around the edge of the barrier thereby preventing the possibility of internal short circuits being set up within the cell; and the provision of maximum electrical and chemical insulation between the internal elements of the cell and the container itself. It is a comprehensive object of the present invention to provide an improved cell containing structure characterized by a new structural combination of elements cooperating to provide advantageous and improved characteristics in the following respects:

An improved plastic casing for an hermetically sealed dry type alkaline cell which has a single sealed joint for simultaneously hermetically sealing said casing and for hermetically sealing the barrier within the cell to said casing.

An improved light weight non-metallic casing for an hermetically sealed dry type alkaline cell providing a maximum of electrical and chemical insulation.

An improved cell containing structure which will prevent the transfer of material from the cathode to the anode and vice versa.

An improved cell containing structure which can be manufactured in parts and economically assembled without contamination of either the cathodic or anodic materials.

Other objects will become apparent from the following description of a preferred embodiment of the invention in its application to known alkaline dry cells comprising essentially, as internal elements, an anode of amalgamated zinc or its equivalent, a cathode consisting of an electronically conductive mass of oxygen yielding compounds such as mercuric oxide, silver oxide or the like, an ionically conductive barrier between said anode and cathode, and an immobilized body of an aqueous alkaline metal hydroxide electrolyte initially containing a substantial quantity of alkaline metal in solution.

Figure 1:
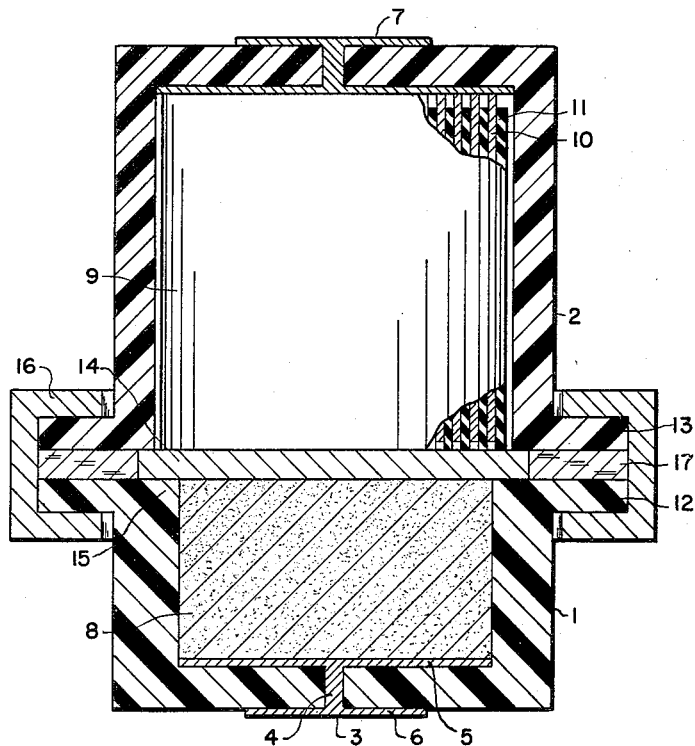
Figure 1 is a vertical sectional view, (the anode being shown partly in elevation), of a cell embodying one form of the present invention.

The primary cell illustrated in Fig. 1 comprises containers 1 and 2 of plastic dielectric material such as polysterene, methyl-methacrylate, ethyl cellulose, nylon or other synthetic high polymers conventionally used for such purposes. A cathode terminal 3 in inert metal such as steel is molded into the bottom of the plastic container 1. The terminal 3 consists of a shank 4 and enlarged internal and external head portions 5 and 6 in order to effectively resist leakage and creepage of electrolyte along said portion 5. Internal head portion 5 is enlarged sufficiently so as to present a maximum contact surface to depolarizing cathode 8. Anodic terminal 7 is similarly molded to the bottom of plastic container 2. It should be understood that terminals 3 and 7 need not necessarily consist of solid inert metal as shown, but may be provided by such means as introducing metallic powder or other conducting materials directly into the plastic to serve as terminals.

Plastic container 1 incloses the depolarizing cathode 8 consisting in known manner of an electronically-conductive mass of oxygen yielding compounds such as an oxide of silver or mercury mixed with carbon or graphite.

Plastic container 2 incloses anode assembly 9, comprising a roll of amalgamated zinc foil 10 interwound with a strip of porous electrolyte-retaining sheet spacing material 11. The upper edge of the zinc foil projects at the top of the rolled assembly 9 so as to be in intimate electrical contact with the internal head portion of anodic terminal 7.

Figure 2:
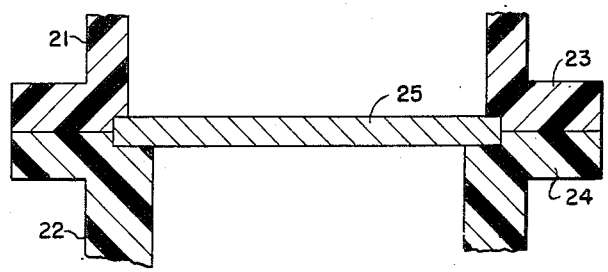
Figure 2 is a vertical sectional view of a modified embodiment of the sealing means.

The open ends of containers 1 and 2 terminate in outwardly extending annular flanges 12 and 13. A barrier disc 14, substantially equal in diameter to the internal diameter of container 2, consisting as is well known, of a material which will allow rapid ionic flow, but prevent the flow of impurities from the depolarizer to the anode, separates the cathodic material in plastic container 1 from the anodic material in plactic container 2; and the edges of which rest upon lip 15 formed by container 1 and its outwardly extending flange 12. An internally channelled annular clamping or crimping member 16 in conjunction with gasket 17 is used to hermetically seal the container 1 to container 2 and rigidly maintain barrier 14 in position thereby keeping the internal elements of the cell under pressure contact with barrier 14 and terminals 3 and 7 and at the same time effectuating the sealing of plastic containers 1 and 2 and of barrier 14 therebetween. In a construction shown in Fig. 2 sealing may be accomplished by other means such as by pressing plastic containers 21 and 22 together and heat sealing flanges 23 and 24 thus providing a pressure seal for both plastic containers 21 and 22 and barrier 25 and removing the requirement for gasket 17 of Fig. 1. It should be noted that flanges 23 and 24 are herein used merely as a means for initially maintaining the plastic containers in position for sealing and may be sheared away, thus presenting a smooth and continuous external surface at their junction.

The particular combination of features as defined by the appended claims provides a primary alkaline dry cell which can be readily and inexpensively made up from single, easily standardized, lightweight sections. The plastic containers electrically isolate the anode and cathode and eliminate the use of other more complicated insulating means for the prevention of the formation of internal electrical couples. Production means are improved by making two parts which can be assembled at some point in the line of production without contamination of etiher the anode or cathode materials. Furthermore, the flanged portions of the containers by pressing on the marginal portions of the barrier, function to assist in making the barrier a more effective seal to prevent the movement of material from one electrode to another and at the same time provide for the sealing of the containers without the use of insulating grommets.

What is claimed is:

In an hermetically sealed primary alkaline dry cell of the zinc-mercuric oxide type having as internal elements a positive and a negative electrode, an ionically conductive barrier between said electrodes and an immobilized alkaline electrolyte; an airtight assembly comprising two individual containers of plastic dielectric material, the first of said containers inclosing said negative electrode, the second of said containers inclosing said positive electrode, one end of each of said containers being closed and having electrical conductive elements thru said ends, the opposite end of each of said containers being open and flanged, said barrier being in intimate contact with said flanged ends, said electrodes being in pressure contact with said barrier and said closed ends, and closing means rigidly and hermetically securing said flanged ends to each other and to said barrier at said flanged ends, said closing means comprising thermoplastically sealed flanges at said flanged ends.

GRENVILLE B. ELLIS.

REFERENCES CITED

The following references are of record in the file of this patent:

UNITED STATES PATENTS

| Number | Name | Date |
|---|---|---|
| 2,422,045 | Ruben | June 10, 1947 |
| 2,458,878 | Ruben | Jan. 11, 1949 |
| 2,483,983 | Quinnell | Oct. 4, 1949 |

FOREIGN PATENTS

| Number | Country | Date |
|---|---|---|
| 60,860 | Germany | Feb. 1, 1892 |
| 224,484 | Switzerland | Mar. 1, 1943 |
| 343,707 | Germany | Nov. 7, 1921 |

OTHER REFERENCES

Serial No. 282,296, Marhenkel (A. P. C.), published May 11, 1943.